United States Patent [19]

Edwards et al.

[11] Patent Number: 4,681,864

[45] Date of Patent: Jul. 21, 1987

[54] CRACKING CATALYST

[75] Inventors: Grant C. Edwards, Silver Spring; Jean-Pierre Gilson, Columbia; Carl V. McDaniel, Laurel, all of Md.

[73] Assignee: W. R. Grace & Co., New York, N.Y.

[21] Appl. No.: 754,781

[22] Filed: Jul. 15, 1985

[51] Int. Cl.[4] .................. B01J 27/18; B01J 29/06; B01J 21/16

[52] U.S. Cl. .................. 502/63; 502/64; 502/214

[58] Field of Search ............ 502/65, 214, 63, 64

[56] References Cited

U.S. PATENT DOCUMENTS 4,440,871  4/1984  Lok et al. ..................... 502/214

*Primary Examiner*—Carl F. Dees
*Attorney, Agent, or Firm*—Arthur P. Savage

[57] ABSTRACT

Catalytic cracking catalyst compositions having a high degree of activity and selectivity for the production of high octane gasoline fractions which comprise stabilized crystalline molecular sieve SAPO-37 dispersed in an inorganic oxide matrix. The crystalline structure and activity of the SAPO-37 molecular sieve component is preserved by including a stabilizing amount of the organic template compound used in the manufacture of the molecular sieve within the pore structure thereof until such time as the catalyst is thermally activated during use.

3 Claims, No Drawings

CRACKING CATALYST

The present invention relates to the preparation and use of catalytic cracking catalysts, and more specifically to the preparation and use of improved molecular sieve containing cracking catalysts which are capable of producing superior yields of high octane gasoline fractions.

It is generally known that the composition of zeolite containing cracking catalyst may be modified to enhance the ability of the catalyst to produce desirable high octane gasoline fractions. In particular, commercial "octane" catalysts which contain "ultrastable" type Y zeolite (USY) have been available to the refining industry for many years.

U.S. Pat. No. 3,994,800 discloses catalysts which contain USY and CREY which are active for the production of high octane gasoline fractions.

U.S. Pat. No. 4,440,871 discloses preparation of crystalline molecular sieve SAPO-37 as well as its use as a catalyst to crack n-butane. Also the paper entitled "Silicoaluminophosphate Molecular Sieves: Another New Class of Microporous Crystalline Inorganic Solids" by B. M. Lok et al, which appeared in J. Am. Chem. Soc. 1984, (106), 6092–6093, discusses SAPO-37.

Due to the relatively low activity of USY type zeolite for the cracking of hydrocarbons as compared to the rare-earth exchanged type Y zeolites frequently used in the manufacture of cracking catalysts, octane catalysts which are based on USY zeolites must contain an exceptionally high level of zeolite component to produce a desired level of conversion, i.e. activity. In view of the fact that octane producing USY zeolite is expensive, and in some instances difficult to incorporate into catalyst composites which are sufficiently attrition resistant for commercial use, currently available octane catalysts are relatively expensive to produce and to use on a commercial scale.

Furthermore, we have found that the apparent relatively poor stability of activated SAPO-37 molecular sieve during storage under ambient conditions indicates that SAPO-37 is not suited for use in the manufacture of commercial cracking catalysts which are made using conventional water-based slurry technology.

It is therefore an object of the present invention to provide a cracking catalyst composition which is both active and selective for the conversion of hydrocarbon feedstocks into high octane gasoline fractions.

It is another object to provide a fluid catalytic cracking (FCC) octane catalyst which possesses good physical properties and that may be produced in commercial quantities at reasonable cost.

It is a further object to provide a method for the preparation and use of SAPO-37 molecular sieve cracking catalyst compositions wherein the activity and crystallinity of SAPO-37 molecular sieve component is maintained during preparation, storage and use of the catalyst.

These and still further objects of the present invention will become readily apparent to one skilled in the art from the following detailed description and specific examples.

Broadly, our invention contemplates the catalytic cracking composition which comprises SAPO-37 molecular sieve having a stabilizing amount of organic template component in the pores thereof admixed with an inorganic oxide matrix.

More specifically, we have found that a catalytic cracking catalyst composition which is both highly active and selective for the production of high octane gasoline fractions may be prepared by combining SAPO-37 molecular sieve which contains an organic template compound in the pore structure thereof in amounts ranging from about 1 to 50% by weight of the molecular sieve with an inorganic oxide matrix component such as silica, alumina, silica-alumina gels and sols, clay and mixtures thereof.

The SAPO-37 molecular sieve component and preparation thereof as well as evaluation thereof as a cracking catalyst is described in U.S. Pat. No. 4,440,871. A typical but non-limiting SAPO-37 molecular sieve suitable for use in the present invention is characterized by the following chemical composition, expressed in terms of ranges of mol oxide ratios:

1.0 $Al_2O_3$:0.4 to 0.8 $P_2O_5$:0.2 to 2 $SiO_2$:0.1 to 3 $(TPA)_2O$:0.01 to 0.1 $(TMA)_2O$:0 to 3.0 $H_2O$ wherein TPA=tetra-n-propyl ammonium ion and TMA=tetra-methyl ammonium ion.

Suitable SAPO-37 molecular sieve is further identified by the X-ray diffraction pattern given in the table below.

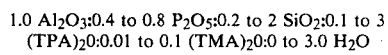

| \multicolumn{6}{c}{X-ray powder diffraction pattern of SAPO-37} |
| dA | I/II | dA | I/II | dA | I/II |
| --- | --- | --- | --- | --- | --- |
| 14.1–14.3 | 100 | 3.77–3.81 | 25–55 | 2.76–2.80 | 1–10 |
| 8.6–8.8 | 15–30 | 3.57–3.61 | 0–4 | 2.69–2.74 | 1–5 |
| 7.3–7.5 | 2–10 | 3.45–3.49 | 2–10 | 2.63–2.67 | 2–15 |
| 5.5–5.8 | 25–60 | 3.29–3.33 | 15–35 | 2.58–2.61 | 1–6 |
| 4.7–4.9 | 20–45 | 3.21–3.25 | 0–6 | | |
| 4.3–4.5 | 8–24 | 3.02–3.06 | 2–15 | | |
| 4.05–4.25 | 1–8 | 2.70–2.94 | 5–20 | | |
| 3.89–3.94 | 5–16 | 2.84–2.89 | 8–26 | | |

In general, the SAPO-37 is prepared in accordance with the procedures set forth in U.S. Pat. No. 4,440,871 by combining the following ratio of rectants:

| Reactant (As oxide or hydroxide) | Mols |
| --- | --- |
| $Al_2O_3$ | 1.0 |
| $SiO_2$ | 0.3 to 5 |
| $P_2O_5$ | 0.5 to 2 |
| TPAOH | 1 to 4 |
| TMAOH | 0.02 to 0.2 |
| $H_2O$ | 25 to 200 |

The resulting mixture is reacted at a temperature approximately of from 150° to 250° C. for a period of 2 to 96 hours at autogeneous pressure in a sealed vessel or autoclave.

To prepare the catalyst of the present invention, the as-synthesized SAPO-37 molecular sieve which contains the organic template component in the intrapore structure is mixed with an inorganic oxide matrix and formed into particles of desired size, i.e. typically from about 40 to 120 micrometers in the case of FCC catalysts. The procedures used in the manufacture of the catalyst is such that the organic template component remains in the pore structure of the SAPO-37 molecular sieve until such time as the catalyst is placed into use under hydrocarbon conversion conditions wherein the catalyst is activated by temperatures on the order of 400° to 800° C. within a catalytic cracking unit.

We have found that if the organic template component is removed from the SAPO-37 molecular sieve, i.e. the composition is activated by removal of the organic template, and subsequently exposed to moisture at approximately ambient temperature, the crystalline structure of the molecular sieve degrades and catalytic activity decreases. On the other hand, we have found that if the organic template is retained in the molecular sieve until the catalyst is activated during use to remove the template from the intrapore structure and if thereafter the catalyst is maintained under conditions wherein exposure to moisture is minimized, the crystalline structure of the SAPO-37 zeolite remains stable, i.e. is retained, and the catalyst remains active for the catalytic conversion of hydrocarbons at temperatures ranging from 400° to 600° C. and remains active after regeneration at temperatures ranging from 600° C. to 850° C. for extended periods of time.

The catalyst compositions contemplated herein contain from about 1 to 80 percent by weight, and preferably from 5 to 30 percent by weight SAPO-37 molecular sieve admixed with other catalyst forming components such as inorganic oxide matrix binder components, including silica, alumina, silica-alumina sols and gels, clay, particulate alumina, but not limited to the aforementioned. It is also contemplated that additional catalytically active zeolite components such as type Y faujasite, ultrastable Y, rare-earth and calcined rare-earth exchanged Y, PCY, and mixtures thereof may be included along with SAPO-37 molecular sieve in the preparation of the catalysts contemplated herein. In a preferred method for preparing catalysts of the present invention, the SAPO-37 molecular sieve is combined with a silica sol or alumina sol binder such as Ludox or aluminum chlorhydrol, clay and sufficient water to form a pumpable slurry, which is then spray dried at temperatures of about 150° to 350° C. to obtain particles in the fluidizable size range of from about 30 to 120 micrometers. Typically preferred compositions contain 5 to 30 weight percent SAPO-37 molecular sieve, 15 to 40 percent $SiO_2$ or $Al_2O_3$ sol binder, and the balance kaolin. Additional preferred compositions will also include particulate alumina, silica alumina hydrogel, and catalytically active zeolites, as disclosed in U.S. Pat. No. 3,293,192, 3,595,611, 3,402,996, 3,607,043, 3,676,368 and 3,702,886, and mixtures thereof. However, we have found that a water based slurry of SAPO-37 and the other ingredients of the catalyst composition must have a pH no more than 12, not less than 2, or the SAPO-37 will lose crystallinity.

Subsequent to forming the catalyst particles, the catalyst is maintained under storage conditions wherein the organic template component is retained in the SAPO-37 molecular sieve until such time as the catalyst is placed into a catalytic cracking unit, wherein the reactor is operated at 400° to 600° C. and the regenerator operated at about 600° to 850° C. When the catalyst is exposed to the FCC reaction conditions, the organic template is removed from the molecular sieve pore stucture, and the catalyst becomes activated for the cracking of hydrocarbons. We have found that as long as the catalyst is maintained at temperatures normally present in the FCC unit, the crystalline structure of the SAPO-37 molecular sieve, as well as the activity of the catalyst is retained for the normal life of the catalyst.

Specific preferred methods for preparing the catalyst compositions involve the procedures generally set forth in Canadian No. 967,136, U.S. Pat. Nos. 3,957,689, 4,126,579 and 4,226,743, as well as 4,458,023, wherein calcination (heating) temperatures above about 200° C. are avoided until such time as the catalyst is placed in use within a FCC unit. Under such conditions, it is found that the organic template component present in the SAPO-37 remains in the intrapore structure and stabilizes the molecular sieve against degradation, i.e. loss of crystallinity.

The catalysts of the present invention, when used in the catalytic cracking of hydrocarbons, possess an activity of from about 40 to 85 percent conversion, as measured by a standard microactivity test which involves using a modification of the microactivity test procedure published by F. G. Ciapetta and D. S. Henderson entitled "Microactivity Test For Cracking Catalysts", Oil and Gas Journal, Vol. 65, pages 88–93, Oct. 16, 1967. The microactivity test was conducted oy passing 0.67 g West Texas heavy gas oil (WTHGO) through 2.0 g catalyst in 1.25 minutes. The products were collected and the percent conversion of gas oil into hydrogen, light gases, gasoline range hydrocarbons, light cycle oil, heavy cycle oil, etc. was determined by gas chromatography. The feedstocks which are used typically comprise heavy gas oils as well as residual feedstocks, wherein in excess of about 20 percent of the feedstock boils above 482° C. The catalyst will produce gasoline fractions ranging from about 40 to 70 volume percent of the feedstock. Furthermore, the gasoline fractions will typically possess octane numbers of 78 to 84 motor and 85 to 95 research. It is also found that the catalysts have desirably low coke and hydrogen producing characteristics.

Having described the basic aspects of the invention, the following examples are given to illustrate specific embodiments thereof.

EXAMPLE 1

Preparation of SAPO-37

A slurry for the synthesis of SAPO-37 was prepared by mixing 235 g of 85% phosphoric acid with 259 g water and 141 g alpha-alumina monohydrate (loss on ignition=29.8%) in a blender. Then 985 g of a 40% solution of tetra-n-propylammonium hydroxide (TPAOH) were mixed with 9.5 g tetramethylammonium hydroxide pentahydrate (TMAOH) and 79 g fumed silica (Cab-O-Sil M-5) were mixed in a second blender cup. The alumina-acid slurry was transferred to a four liter steel blender cup, and the silica-TPAOH/TMAOH slurry was added with rapid mixing. Mixing was continued in the four liter cup for one minute. The slurry which has a composition expressed in terms of component oxide ratio $Al_2O_3$ $P_2O_5$: 1.2 $SiO_2$: 0.025 $TMA_2O$: 1.0 $(TPA)_2O$: 50 $H_2O$ was transferred to a stirred autoclave and heated to 200° C. for 22 hours to crystallize. After the autoclave has cooled to about room temperature, the slurry was removed from the pressure vessel and centrifuged to recover the SAPO-37. The cake of product was reslurried with hot deionized water and centrifuged again to wash out the mother liquor. Next the cake was reslurried a second time with hot deionized water and centrifuged again. Then the product was dried at 150° for 2–3 hours. About 120 g of oven dried powder were obtained from each batch. The X-ray diffraction powder pattern of our SAPO-37 essentially matched that given in U.S. Pat. No. 4,440,871 as Table W. Several samples of SAPO-37 which had good crystallinity and low levels of impurities gave nitrogen surface area values of about 800–900 m²/g immediately after calcination at 550° C. to remove the occluded organic template. A typical chemical analysis of one of the above preparations is given in Table I.

TABLE I

| Sample | 1A<br>Dried - 150° C. | 1B<br>Calcined - 550° C. |
|---|---|---|
| wt. % Loss on Ignition | 24.2 | — |
| wt. % Carbon | 12.2 | — |
| wt. % Na₂O | 0.04 | 0.06 |
| wt. % Al₂O₃ | 34.3 | 45.3 |
| wt. % SiO₂ | 13.7 | 18.1 |
| wt. % P₂O₅ | 27.4 | 36.2 |
| % TOTAL OXIDES | — | 99.7 |

EXAMPLE 2

Catalysts Made From SAPO-37 Which Have Low Cracking Activity

The following catalysts are for illustrative and comparison purposes only and are not our invention. A sample of SAPO-37 was made by following the procedure of Example 43 in U.S. Pat. No. 4,440,871. After the product was washed free of mother liquor, dried, it was calcined at a temperature of 550° C. for 2 hours. It was exposed to laboratory air overnight and was then made into a catalyst. The composition of the catalyst was 25% calcined SAPO-37:75% kaolin clay on a dry basis. The catalyst was a dry, well-mixed blend of the SAPO-37 and clay. It was tested in two forms.

(1) after calcination 1000° F. (538° C.) for 2 hours (Sample 2A);

(2) after S-13.5 steam deactivation (Sample 2B).

A blank catalyst composed of 75% clay and 25% SiO₂ binder was included (Sample 2C). The results are shown below in Table II.

TABLE II

Microactivity Tests[1] of Catalysts Made From SAPO-37 Which Was Exposed to Moist Air After Calcination

| | SAMPLE | | |
|---|---|---|---|
| | 2A | 2B | 2C |
| COMPOSITION (wt. %) | | | |
| SAPO-37 | 25 | 25 | — |
| Clay | 75 | 75 | 75 |
| SiO₂ | — | — | 25 |
| ACTIVATION CONDITIONS | | | |
| Thermal (air, 2 hrs.) | 538° C. | 538° C. | 538° C. |
| Hydrothermal | — | S-13.5[2] | — |
| CONVERSION (Vol. %) | 19 | 22 | 17 |
| H₂ (wt. %) | — | 0.10 | 0.27 |
| COKE (wt. % of Feed) | — | 0.5 | 1.7 |

[1]Test Conditions:
Feed: West Texas Heavy Gas Oil (WTHGO)
Temperature: 499° C.
Cat/oil: 3
WHSV: 16 h⁻¹
[2]S-13.5: 100% steam, 1.1 kg.cm⁻² gauge pressure/732°/8 hrs.

The results in Table II indicate that the conversion of gas oil by SAPO-37 which has been exposed to moist air is not better than the conversion by the 75 clay: 25 SiO₂ binder blank.

EXAMPLE 3

Catalysts Made From SAPO-37 Which Have Very Good Cracking Activity

The results above clearly demonstrate that a catalyst containing calcined SAPO-37 (TMA/TPA removed) must not be allowed to be exposed to moist air. The following two catalysts illustrate our novel techniques of making an active cracking catalyst from SAPO-37. Two laboratory catalysts were made; one used SAPO-37 synthesized by the procedure of Example 2, and the second catalyst used SAPO-37 made by the higher silica process described above in Example 1. The composition of each catalyst was on a dry basis.

10% SAPO-37

65% Natka Clay

25% Silica binder derived from Ludox AS-40 silica sol.

The first catalyst was made by blending 91 g kaolin into 200 g of water and 75 g of Ludox AS-40 silica sol. Then 15 g of uncalcined SAPO-37, loss on ignition (LOI)=21%, were added to the clay/Ludox/water mixture and blended for one minute. The resulting slurry was then dried in an evaporating dish overnight at about 150° C.; the drying produced a hard cake of catalyst whic then gently crushed to a coarse powder which was screened. The fraction which passed a 60 mesh screen (250 micrometers diameter holes) and was retained on a 140 mesh screen (106 micrometer diameter holes) was used for microactivity tests. The catalyst was designated Sample 3A.

The second catalyst designated Sample 3B was made in the same manner but used the higher silica SAPO-37 described above in Example 1. Since the LOI of the higher silica SAPO=29%, 17 grams were used.

Special precautions must be taken to make certain the SAPO-37 in these catalysts does not lose crystallinity by exposure to moist, room temperature air. After the catalyst particles were prepared by screening, the catalyst was calcined at 1000° F. (538° C.) for 2 hours in air to burn out the TPA and TMA organic templates which are required for the synthesis of the type of SAPO-37 used herein. The burnout of the templates clears the pores and channels of the SAPO-37 molecular sieve for catalysis but leaves the SAPO-37 vulnerable to attack by moisture in the air. As soon as the burnout was completed, the catalysts were placed in sealed jars to protect the SAPO-37 from moisture and conveyed to the steamer unit for the S-13.5 steam deactivation (defined in Table II). The catalyst was quickly placed in the sample holders of the steamer unit, and the unit was sealed. Then a flow of dry nitrogen was turned on, and the unit was heated to operating temperature. After the steam deactivaton was completed, the sample holders containing the SAPO-37 catalysts were unloaded as quickly as possible, and the catalysts were placed back into sealed jars. The microactivity tests were run as soon as possible, and care was taken to minimize exposure to moist ambient air.

In contrast to the special precautions taken to prevent the loss of crystallinity of SAPO-37 in catalysts, it is well known in the art that low soda (LS) CREY, REY, and USY catalysts do not lose crystallinity when exposed to moist air. Therefore no special precautions need be taken when catalysts containing LS-CREY, REY, and USY are calcined and/or steam deactivated.

These two SAPO-37 catalysts were tested for cracking activity in comparison with two catalysts made from 10% low sodium calcined rare earth Y type faujasite (LS-CREY) in the same matrix (Samples 3C and 3D). The results in Table III clearly show that SAPO-37 catalysts have comparable cracking activity and selectivity to LS-CREY catalysts. Furthermore, the catalyst containing the higher silica SAPO-37 of Example 1 has more activity (MA=69) than the catalyst employing the SAPO-37 that is made by replicating Example 43 of U.S. Pat. No. 4,440,871 as described in our Example 2 (MA=58). In addition the catalyst containing the SAPO-37 of Example 1 has a greater activity (MA=69) than both of the LS-CREY catalysts (MA=64 and 66).

These tests establish that SAPO-37, especially "higher silica" SAPO-37 of our Example 1 makes a very active catalyst for gas oil cracking.

TABLE III

Microactivity Tests of Steam Deactivated SAPO-37 Catalysts Compared to Steamed Low Soda CREY Catalysts

| | Sample No. | | | |
|---|---|---|---|---|
| | 3B | 3A | 3C | 3D |
| Composition, W % | ←10 SAPO-37→ | | ←10 LS CREY→ | |
| | | ←65 Clay→ | | |
| | | ←25 $SiO_2$→ | | |
| Std. Conv., V % | 69.1 | 58.1 | 64.2 | 66.1 |
| Mod. Conv. (Incl LCO), V % | 83.8 | 73.9 | 80.0 | 81.6 |
| $H_2$, W % | 0.045 | 0.030 | 0.050 | 0.021 |
| $C_1$, W % | 0.24 | 0.19 | 0.27 | 0.29 |
| Tot. $C_2$, W % | 0.63 | 0.44 | 0.62 | 0.63 |
| Tot. $C_1 + C_2$, W % | 0.88 | 0.63 | 0.89 | 0.92 |
| $C_2^=$, V % | 4.9 | 4.2 | 4.9 | 4.8 |
| $C_3$, V % | 1.2 | 0.7 | 1.1 | 1.2 |
| Tot. $C_3$, V % | 6.1 | 4.8 | 6.1 | 6.0 |
| $C_4^=$, V % | 6.0 | 5.3 | 5.1 | 4.9 |
| $i\text{-}C_4$ V % | 6.1 | 3.9 | 5.2 | 5.1 |
| $n\text{-}C_4$, V % | 1.2 | 0.7 | 1.1 | 1.1 |
| Tot. $C_4$, V % | 13.4 | 9.9 | 11.3 | 11.1 |
| $C_5^+$ Gasoline, V % | 63.6 | 54.3 | 59.0 | 60.8 |
| $C_5^+$ Gasoline/Conversion | 0.92 | 0.93 | 0.92 | 0.92 |
| Light Cycle Oil, V % | 14.7 | 15.8 | 15.8 | 15.5 |
| Tot. Gasoline + Distillate, V % | 78.3 | 70.0 | 74.8 | 76.3 |
| 338° C.+ Bottoms, V % | 16.2 | 26.1 | 20.0 | 18.4 |
| Coke, W % Catalyst | 0.6 | 0.4 | 0.6 | 0.5 |
| Coke, W % Feed 1.7 | 1.1 | 1.7 | 1.6 | |
| Std. Conv./Coke | 40.4 | 51.2 | 37.6 | 41.4 |

MA Test Conditions: Catalyst was calcined at 538° C. for 2 hours, then steam deactivated by S-13.5 method defined in Example 2. MA test run at 499° C., 3 c/o, and 16 WHSV using WTHGO feed.

SAPO-37 Analysis (molar ratios):
3B: 1.00 $Al_2O_3$:0.68 $SiO_2$:0.57 $P_2O_5$ from Example 1.
3A: 1.00 $Al_2O_3$:0.42 $SiO_2$:0.64 $P_2O_5$ from Example 2.

EXAMPLE 4

Pilot Unit Catalysts

A large batch of catalyst was prepared for FCC pilot unit tests which yield enough products for analysis including sufficient gasoline so that octane measurements of the gasoline may be made on an octane motor. Therefore a scaled-up version of the catalyst described above as Sample 3B was made as follows.

Several batches of catalyst were combined; the LOI of the composite was 25.0%. 533 g of the composite sample of SAPO-37 were dispersed in a blender cup with 3 liters of water. This was then added to a slurry of 3067 g clay (LOI=15.2%) in 2500 g Ludox AS-40 silica sol (40% $SiO_2$). The slurry of SAPO-37, clay, water and silica sol was then spray dried using an inlet temperature of 316° C. and an outlet temperature of 149° C. under 2.8 atmospheres pressure. This catalyst was designated Sample 4A. Its composition on a dry basis was:
10% SAPO-37
65% Clay
25% $SiO_2$ Binder.

Its chemical and physical analyses are given in Table IV.

Two catalysts based on Y type faujasite were tested for comparison. One was a catalyst made according to the teaching of U.S. Pat. No. 3,994,800, and designated Sample 4B. The composition was on a dry basis:
40% Ultrastable Y (USY)
35% Clay
25% $SiO_2$ Binder.

The second comparison catalyst was a catalyst made according to the teachings of U.S Pat. No. 3,957,689, designated as Sample 4C. The composition on a dry basis was:
17% Rare Earth Y (REY)
63% Clay
20% $SiO_2$ Binder.

TABLE IV

Chemical and Physical Analyses of SAPO-37 Catalyst Compared to USY and REY Catalyst

| | Sample | | |
|---|---|---|---|
| | 4A | 4B | 4C |
| Composition (dry basis) | | | |
| Wt. % molecular sieve | 10 SAPO-37 | 40 USY | 17 REY |
| Wt. % Clay | 65 | 35 | 63 |
| Wt % $SiO_2$ Binder | 25 | 25 | 20 |
| Chemical Analysis (dry basis) | | | |
| $Al_2O_3$, Wt % | 33.81 | 28.4 | 29.1 |
| $RE_2O_3$, Wt % | 0.1 | 0.1 | 3.0 |
| $Na_2O$, Wt % | 0.2 | 0.3 | 0.8 |
| $P_2O_5$, Wt. % | 5.3 | — | — |

The pilot unit used a fixed fluid bed and held a charge of about 250 g of steam deactivated catalyst. The same special precautions described above were used to make certain the 10% SAPO-37 catalyst was not exposed to moist, room temperature air before, during or after calcination and steam deactivation. The feed for the pilot unit was a heavy gas oil, a mid-continent feed having the following properties:
API Gravity 15.5° C.=23.1
Sp. gr. at 15.5° C.=0.9155
Aniline Point=98.6° C.
K Factor=11.95
W % Conradson Carbon=0.40
W % Vanadium=2 ppm
W % Nickel=0.3 ppm
W % Copper=0.3 ppm
W % Iron=3.0 ppm
W % Sulfur=0.64
W % Nitrogen=0.1z The unit was operated using 510° C. in the cracking zone and 677° C. in the regeneration zone. Approximately 10 cycles of cracking and regeneration were done on each catalyst.

Two pilot runs, one at weight hourly space velocity (WHSV)=about 30 and one at about 40, were made for each of the three catalysts. The results were plotted as weight % (W %) or volume % (V %) of each product vs. % conversion. The results were then plotted on a graph and interpolated for a standard conversion of 65% for each catalyst, and they are given in Table V. The results show that:
10% SAPO-37 catalyst is about as active as 17% REY and 40% USY.
The gasoline from 10% SAPO-37 catalyst has 2 numbers motor octane number (MON) higher than that from the REY catalyst and one number MON higher than the USY catalyst.

The gasoline from 10% SAPO-37 has one number more research octane number (RON) than REY but two numbers less RON than USY.

The regenerated SAPO-37 catalyst was discharged hot from the pilot unit and immediately put into a sealed container. A sample of this catalyst was taken from the sealed container 3 weeks later and tested for microactivity, using the test described in Table III. The catalyst was still very active since it had a MA=70. This result clearly demonstrates that the prevention of moisture absorption by a SAPO-37 catalyst keeps it active.

TABLE V

Comparison of SAPO-37 Catalyst with a USY Catalyst and a REY Catalyst at 65% Conversion

| | Catalyst No. | | |
|---|---|---|---|
| | 4A | 4B | 4C |
| Composition | 10% SAPO-37 65% Kaolin 25% SiO$_2$ Binder | 40% USY 35% Kaolin 25% SiO$_2$ Binder | 17% REY 63% Kaolin 20% SiO$_2$ Binder |
| Deactivation Conditions | S-13.5[1] | ←S-20[2]→ | |
| WHSV (h$^{-1}$) | 34 | 44 | 44 |
| Ratio Catalyst/Oil | 3.5 | 2.7 | 2.7 |
| H$_2$, Weight %, (W %) | 0.03 | 0.03 | 0.02 |
| C$_1$, W % | 0.4 | 0.3 | 0.3 |
| C$_2$, W % | 0.7 | 0.5 | 0.5 |
| C$_2$=, W % | 0.3 | 0.3 | 0.3 |
| Tot. C$_1$ + C$_2$, W % | 1.4 | 1.1 | 1.1 |
| C$_3$=, Volume %, (V %) | 6.8 | 5.2 | 5.2 |
| N—C$_3$, V % | 1.6 | 1.3 | 1.3 |
| Total C$_3$, V % | 8.4 | 6.5 | 6.5 |
| C$_4$=, V % | 5.5 | 5.5 | 4.2 |
| I-C$_4$, V % | 5.6 | 4.2 | 4.2 |
| n-C$_4$, V % | 1.0 | 0.7 | 0.7 |
| Total C$_4$, V % | 12.1 | 10.7 | 9.1 |
| C$_5$+ Gasoline[3], V % | 57.5 | 60.0 | 60.0 |
| Liquid Gasoline[3], V % | 88 | 83 | 93 |
| Aniline Pt., °F. | | | |
| RON + O | 89.4 | 91.8 | 88.2 |
| MON + O | 81.7 | 80.4 | 79.7 |
| (RON + MON)/2 | 85.6 | 86.1 | 84.0 |
| Bromine Number | 48 | 63 | 46 |
| Light Cycle Oil, V % | 16.4 | 16.4 | 17.6 |
| Bottoms boiling above 338° C., V % | 19.0 | 19.0 | 16.5 |
| Coke, W % Feed | 3.6 | 3.5 | 3.4 |

[1] S-13.5 deactivation conditions are 732° C.; 2 atm. pressure of 100% steam; 8 hours.
[2] S-20 deactivation conditions are 827° C.; 1 atm. pressure, 20% steam/80% air; 12 hours.
[3] 212° C. Endpoint.

We claim:
1. In a method for preparing a catalytic cracking catalyst composition which comprises:
   (a) from about 1 to 50% by weight SAPO-37 molecular sieve which contains from about 5 to 40% by weight of an organic template component selected from the group consisting of TPA, TMA, and mixtures thereof; and
   (b) an inorganic oxide matrix selected from the group consisting of silica, alumina, silica-alumina sols and gels, clay, zeolites and mixtures thereof;
the improvement comprising admixing said SAPO-37 molecular sieve with matrix forming components, and forming a particulate catalyst under conditions wherein said organic template remains in the pore structure of the SAPO-37 molecular sieve prior to use in a catalytic conversion process.

2. A catalytic cracking catalyst prepared by the method of claim 1.

3. The method of claim 1 wherein temperatures in excess of about 300° C. are avoided during preparation and storage of the catalyst composition.

* * * * *